United States Patent
Sun

(10) Patent No.: US 7,173,886 B2
(45) Date of Patent: Feb. 6, 2007

(54) TRACK JUMP METHOD FOR DUAL-LAYERED OPTICAL DISK READING DEVICE

(75) Inventor: Yu-Hung Sun, Hsinchu (TW)

(73) Assignee: Lite-On IT Corp. (TW)

( * ) Notice: Subject to any disclaimer, the term of this patent is extended or adjusted under 35 U.S.C. 154(b) by 623 days.

(21) Appl. No.: 10/626,335

(22) Filed: Jul. 24, 2003

(65) Prior Publication Data

US 2004/0151081 A1 Aug. 5, 2004

(30) Foreign Application Priority Data

Nov. 12, 2002 (TW) .............................. 91133149 A

(51) Int. Cl.
G11B 21/08 (2006.01)

(52) U.S. Cl. .................................. 369/30.12

(58) Field of Classification Search ...................... None
See application file for complete search history.

(56) References Cited

U.S. PATENT DOCUMENTS

| 5,303,225 A | * | 4/1994 | Satoh et al. | 369/275.3 |
| 5,696,743 A | * | 12/1997 | Kawasaki | 369/30.13 |
| 5,729,525 A | * | 3/1998 | Ishida et al. | 369/275.3 |
| 5,781,516 A | * | 7/1998 | Yamada | 369/30.13 |
| 5,881,032 A | * | 3/1999 | Ito et al. | 369/30.1 |
| 5,920,527 A | * | 7/1999 | Aoki | 369/30.15 |
| 6,330,212 B1 | * | 12/2001 | Iida | 369/30.16 |
| 6,370,091 B1 | * | 4/2002 | Kuroda | 369/30.08 |
| 6,801,494 B2 | * | 10/2004 | Ross | 369/275.3 |
| 2004/0001410 A1 | * | 1/2004 | Yonezawa | 369/53.24 |

* cited by examiner

Primary Examiner—Tan Dinh
(74) Attorney, Agent, or Firm—Raymond Sun

(57) ABSTRACT

A method is disclosed for jumping tracks on a double-layer optical disk from a first address A on a first data layer to a target address D on a second data layer. According to the method, the first address A where the optical head is currently positioned is read. Then, after jumping to the second data layer, a relative second address B on the second data layer that corresponds to the first address A on the first data layer is read. If the second address B on the second data layer is smaller than the first address A on the first data layer, then the address of the second address B on the second data layer is shifted and a new target address is obtained on the second data layer based on this address shift. A calculation function is performed based on the first address A and the new target address, and then the optical head is moved to the new target address on the second data layer. On the other hand, if the second address B on the second data layer is larger than the first address A on the first data layer, then a calculation function is calculated based on the second address B and the target address D, and then the optical head is moved to the target address D on the second data layer.

4 Claims, 7 Drawing Sheets

TRACK JUMP METHOD FOR DUAL-LAYERED OPTICAL DISK READING DEVICE

BACKGROUND OF THE INVENTION

1. Field of the Invention

The present invention relates to an optical disk reading device, and in particular, to a track jumping method for an optical recording medium. In particular, the present invention pertains to a track jumping method for an optical head that can be used when the address of the present location of the optical head and the target address are in different data layers.

2. Description of the Prior Art

FIGS. 1(a) and 1(b) are cross-sectional views illustrating a conventional single-layer disk and a conventional double-layer disk, respectively. The currently-available optical recording medium (i.e., disks) can be classified into two types, a single-layer disk 10 and a double-layer disk 20. For the single-layer disk 10 shown in FIG. 1(a), the digital data is recorded on a data (reflection) layer 12, which is covered by a plastic layer 14. For the double-layer disk 20 shown in FIG. 1(b), the digital data can be stored in two data (reflection) layers 22 and 24, which are covered by a plastic layer 26.

FIG. 2 is a top view of a single-layer disk. Generally speaking, the starting point of the tracks (address of starting point: 0x00000) of a conventional single-layer disc 10 is on the innermost circle of the single-layer disk 10. The tracks radiate outwardly in the form of a continuous spiral from the innermost circle. A calculation function is usually placed in general firmware for calculating the number of tracks between the address of the present location of the optical head and the target address, as well as the direction of movement of the optical head, after the address where the optical head is located and the target address are input. The servo-control system in the disk driver can control the optical head to jump over a specified number of tracks in a specified direction according to the aforementioned calculated number of tracks and movement direction to reach the target address. This calculation function is valid only when the starting point of the tracks is on the innermost circle of the disk. Therefore, if the starting point of the tracks (address of starting point: 0x00000) is not on the innermost circle of the disk, this function will generate errors and therefore cannot be used.

FIG. 3 illustrates the relative position of each layer in an ideal double-layer disk. In FIG. 3, the tracks that are distributed outwardly in a spiral are represented instead as linear tracks. Ideally, the starting point of the tracks (address of starting point: 0x00000) of the two upper and lower data layers of an ideal double-layer disk is on the innermost circle of the disk. The relative address of the second data layer that is directly above the address of the starting point (0x00000) of the first data layer should also be the address of the starting point (0x00000). Similarly, the address of the first data layer at any position should be the same as the relative address of the second data layer at the corresponding position directly above. For example, the corresponding address positions (0x22ff00) of the upper and lower data layers should is be the same.

A conventional double-layer disk uses the following access track-jumping method. First, it is assumed that the optical head is located at address 0x30000 on the first data layer, while the target address is 0x22ff00 on the second data layer. With this assumption in place, the following steps are usually carried out:

First Step: Read the address on the first data layer where the optical head is located (0x300000);

Second Step: Focus and jump to the second data layer;

Third Step: Read the relative address (0x30000) on the second data layer at the corresponding position directly above the first data layer;

Fourth Step: Input (i) the relative address (0x30000) where the optical head is located on the second data layer, and (ii) the target address (0x22ff00) on the second data layer, to a calculation function and calculate the number of tracks between these two addresses as well as the movement direction of the optical head;

Fifth Step: The servo-control system of the disk driver controls the optical head to reach the target address according to the calculated number of tracks and movement direction of the optical head.

To move the optical head from the address where the optical head is located on a specific data layer to the target address on the other data layer, it is first necessary to focus and jump from the original data layer to the other data layer and read the relative address, followed by track jumping on the other data layer. When the optical head jumps over tracks on a certain data layer, the aforementioned calculation function will be used. The relative address where the optical head is located, and the target address, are input into the calculation function to calculate the number of tracks between the two addresses and the movement direction of the optical head so that the optical head can be controlled to reach the target address. The calculation function is applicable to each data layer of the ideal double-layer disk.

Unfortunately, in an actual double-layer disk, the relative addresses between layers are not necessarily consistent, and address shifts might occur. FIG. 4 illustrates the case in which the starting point of a data layer (address of starting point: 0x00000) in a double-layer disk is not on the innermost circle of the disk. The starting point of the tracks (address of starting point: 0x00000) of disk 20 is not on the innermost circle of disk 20, wherein the tracks radiate outwardly in a spiral. To illustrate this, assume that the tracks of the first data layer of the double-layer disk are as shown in FIG. 2, while the tracks of the second data layer of the same double-layer disk are as shown in FIG. 4. FIG. 5 shows the relative positions of each layer of the double-layer disk with the address shift. In FIG. 5, the two tracks that are distributed outwardly in the form of a spiral are shown as linear tracks.

For example, in the case of FIG. 5, it is assumed that the optical head is currently located at address 0x30000 on the first data layer, while the target address is at 0x22ff00 on the second data layer. First, the address where the optical head is located on the first data layer (0x30000) is read. Then, the optical head is focused and jumps to the second data layer. The relative address (0x1f000) on the second data layer at the corresponding position directly above the first data layer is then read. Then, the relative address (0x1f000) where the optical head is located on the second data layer and the target address (0x22ff00) on the second data layer are input into the calculation function to calculate the number of tracks between these two addresses and the movement direction of the optical head. The number of tracks and the movement direction of the optical head calculated by using the calculation function are valid only when the starting point of the tracks is on the innermost circle of the disk. However, since the starting point of the track of the first data layer is not on the innermost circle of the disk, the input number of tracks between the relative address (0x1f000) of the first data layer and the target address (0x22ff00), as well as the movement direction of the optical head, will contain certain errors. If the servo-control system of the disk driver controls the optical head according to the calculated number of tracks with these errors, the access accuracy will deteriorate, and the optical head will be unable to jump to the correct target address.

SUMMARY OF THE INVENTION

It is an objective of the present invention to provide a method for track jumping between different data layers of an optical disk reading device. This method determines the data layer on which the track starts, starting with the innermost circle, and uses the calculation function to obtain the correct number of tracks to be jumped and the movement direction of the optical head.

In order to realize the aforementioned purpose, the present invention provides a method for jumping tracks on a double-layer optical disk from a first address A on a first data layer to a target address D on a second data layer. According to the method, the first address A where the optical head is currently positioned is read. Then, after jumping to the second data layer, a relative second address B on the second data layer that corresponds to the first address A on the first data layer is read. If the second address B on the second data layer is smaller than the first address A on the first data layer, then the address of the second address B on the second data layer is shifted and a new target address is obtained on the second data layer based on this address shift. A calculation function is performed based on the first address A and the new target address, and then the optical head is moved to the new target address on the second data layer. On the other hand, if the second address B on the second data layer is larger than the first address A on the first data layer, then a calculation function is calculated based on the second address B and the target address D, and then the optical head is moved to the target address D on the second data layer.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1A:
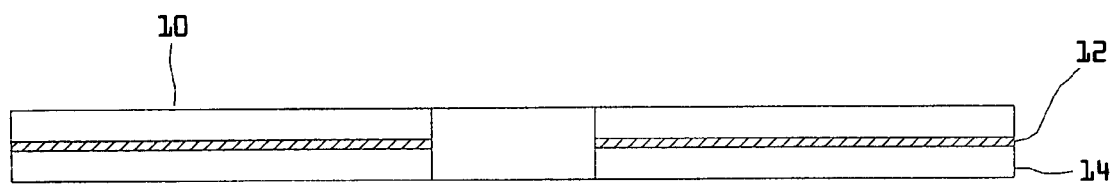
FIGS. 1(*a*) and 1(*b*) are cross-sectional views illustrating a conventional single-layer disk and a conventional double-layer disk, respectively.
Figure 1B:
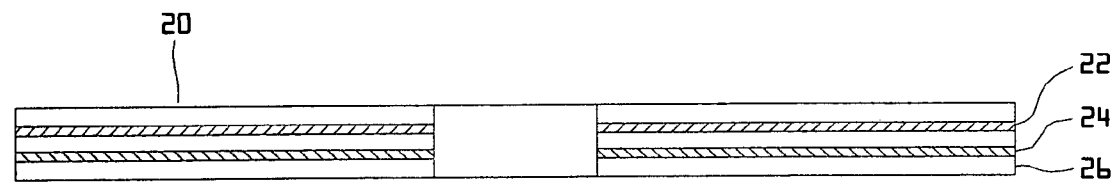
Figure 2:
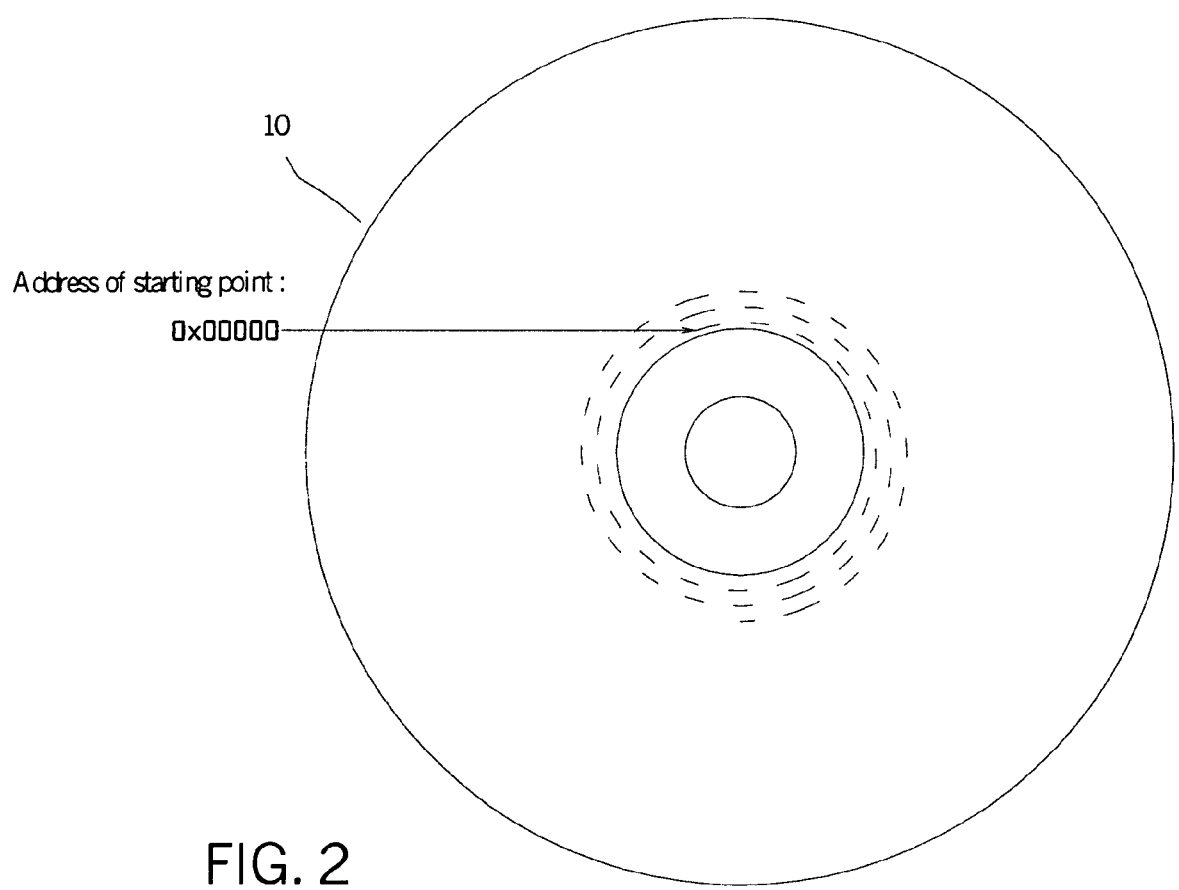
FIG. 2 is a top view of a conventional single-layer disk.
Figure 3:
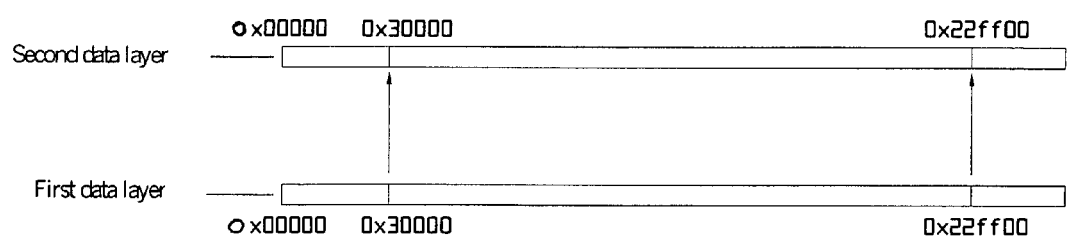
FIG. 3 illustrates the relative position of each layer in an ideal double-layer disk.
Figure 4:
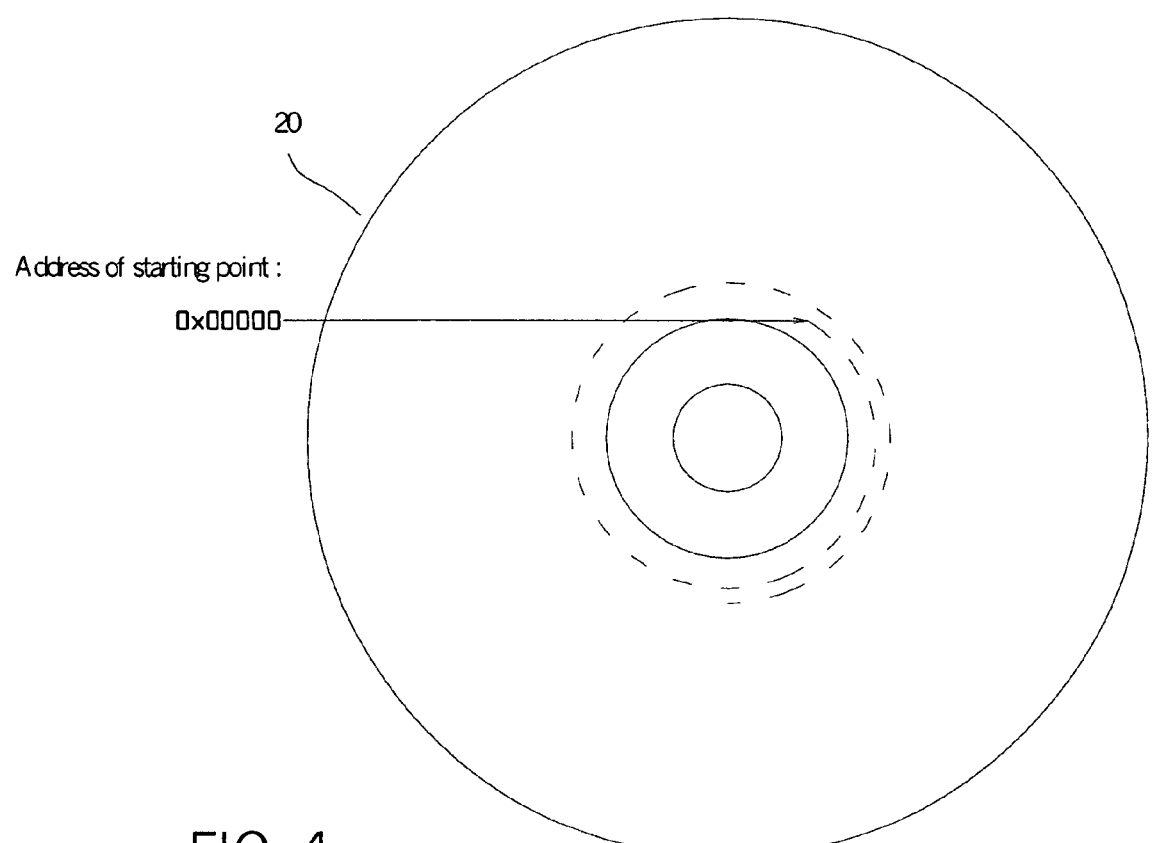
FIG. 4 illustrates one example in which the track starting point of one of the data layers on a double-layer disk is not on the innermost circle of the disk.
Figure 5:
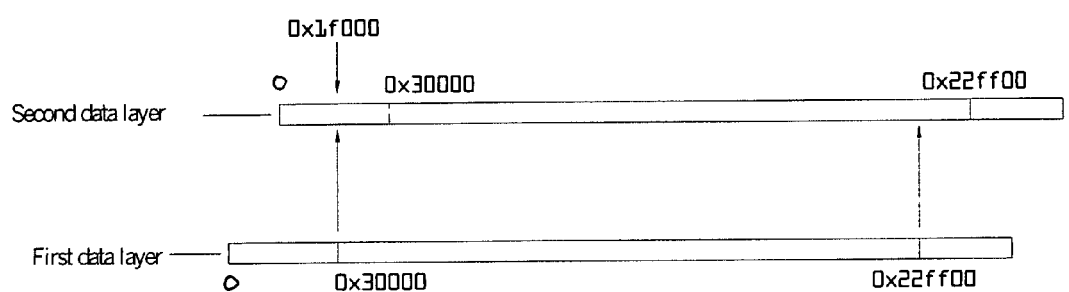
FIG. 5 shows the relative positions of each layer of a double-layer disk having an address shift.
Figure 6:
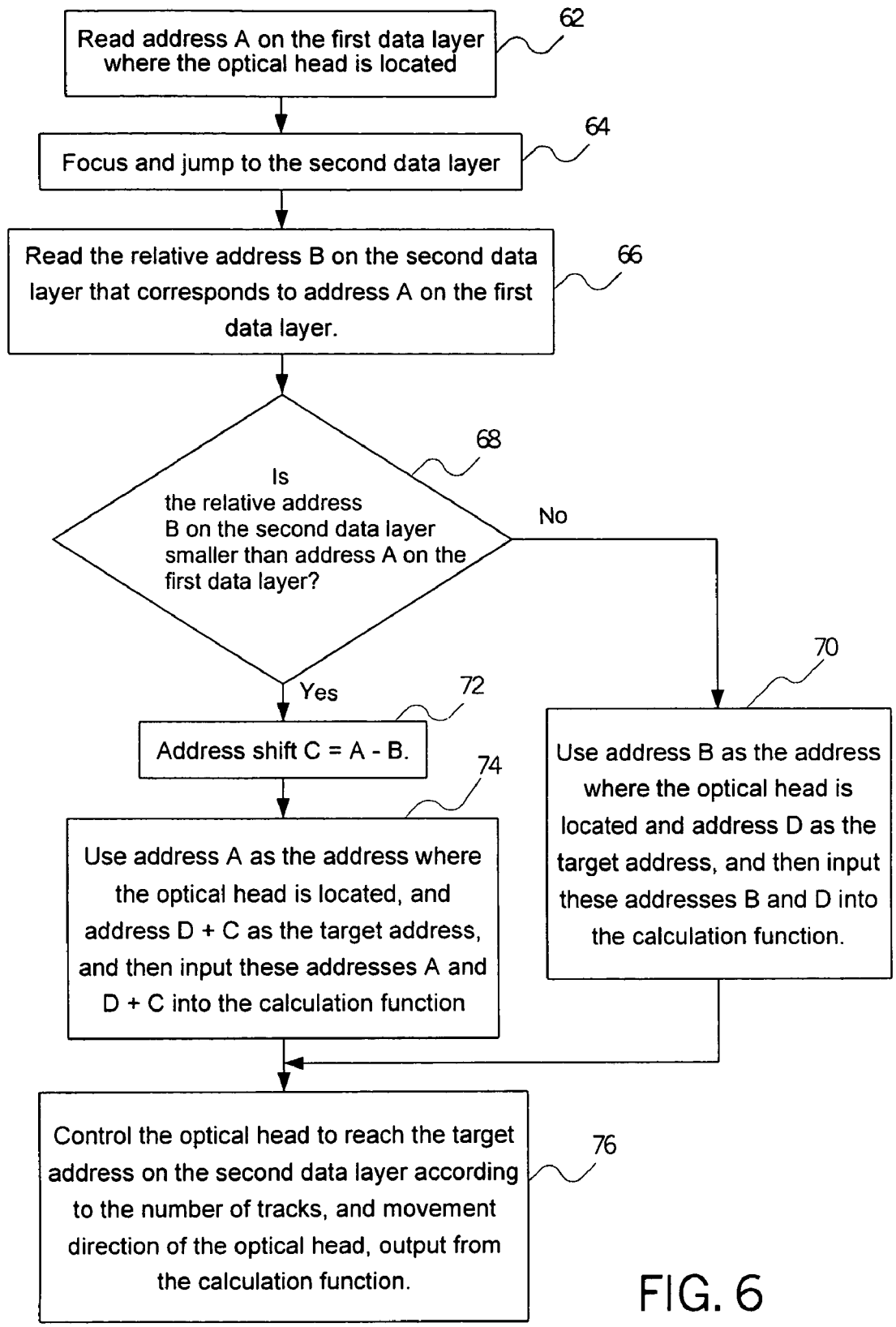
FIG. 6 is a flow chart illustrating a method according to the present invention for track jumping between data layers of a double-layer disk.

FIG. 6 is a flow chart illustrating a method according to the present invention for track jumping between data layers of a double-layer disk. In this process, the optical head will jump from an address A on the first data layer to an address D on the second data layer. The relationship between the first and second data layers can be such that the first data layer is above the second data layer or the second data layer is above the first data layer. The method includes the following steps:

Step 62: Read address A on the first data layer where the optical head is located.

Step 64: Focus and jump to the second data layer.

Step 66: Read the relative address B on the second data layer that corresponds to address A on the first data layer.

Step 68: Compare to see whether the relative address B on the second data layer is smaller than address A on the first data layer. If yes, processing proceeds to step 72, otherwise processing proceeds to step 70.

Step 70: Use address B as the address where the optical head is located, and use address D as the target address, and then input these addresses B and D into the calculation function.

Step 72: Address shift C=A−B.

Step 74: Use address A as the address where the optical head is located, and use address D+C as the target address, and then input these addresses A and D+C into the calculation function.

Step 76: The servo-control system controls the optical head to reach the target address on the second data layer according to the number of tracks, and movement direction of the optical head, output from the calculation function.

Figure 7A:
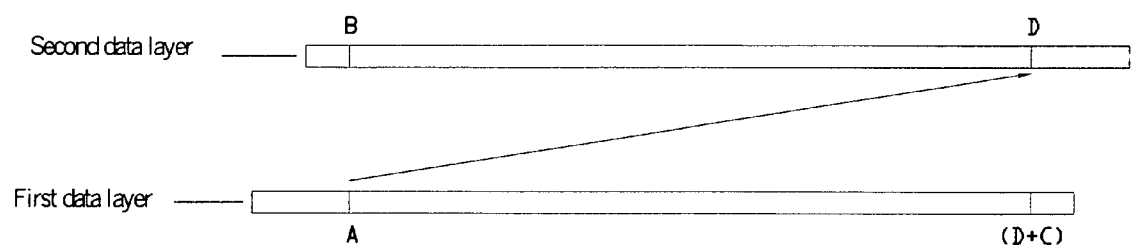
FIGS. 7(*a*) and 7(*b*) illustrate an example of the track jumping method of the present invention.
Figure 7B:
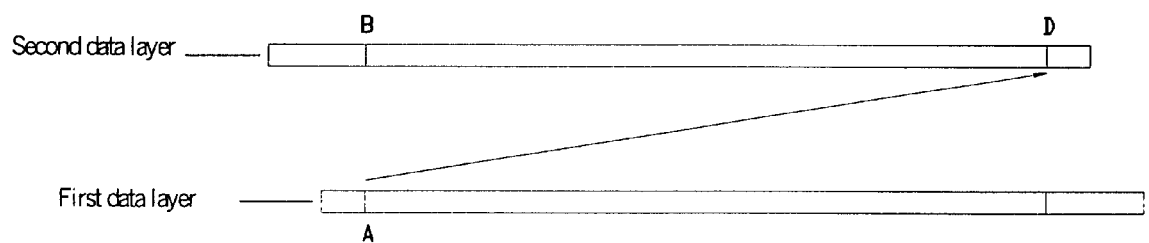

FIGS. 7(*a*) and 7(*b*) help to illustrate the process of the present invention using an example of a double-layer disk that has an address shift. As shown in FIG. 7(*a*), to jump from address A on the first data layer to address D on the second data layer, addresses A and B are first read sequentially by following steps 62, 64 and 66. Then, in step 68, if address A is larger than address B, it can be confirmed that the track starting point of the first data layer is on the innermost circle of the disk. Consequently, it is not possible to directly input the addresses of B and D on the second data layer into the calculation function. Instead, an address shift C=A−B is calculated in step 72. Then, in step 74, address A is used as the address where the optical head is located, and address D+C is used as the target address. Both addresses A and D+C are input into the calculation function. Finally, in step 76, the servo-control system controls the optical head to reach the target address D on the second data layer according to the calculated number of tracks and the movement direction of the optical head output from the calculation function.

Next, as shown in FIG. 7(*b*), to jump from address A on the first data layer to address D on the second data layer, addresses A and B are first read sequentially by following steps 62, 64 and 66. Then, in step 68, if address B is larger than address A, it can be confirmed that the track starting point of the second data layer is on the innermost circle of the disk. Consequently, in step 74, it is possible to input (into the calculation function) the addresses B and D on the second data layer as (i) the address where the optical head is located, and (ii) the target address, respectively. Finally, in step 76, the servo-control system controls the optical head to reach the target address D on the second data layer according to the calculated number of tracks and the movement direction of the optical head output from the calculation function.

Consequently, the present invention provides a track jumping method used for double-layer disks that have address shifts. If the track starting point of the data layer with the target address is not on the innermost circle of the disk, it is necessary to use the address shift to properly compensate for the address that is input into the calculation function. On the other hand, if the track starting point of the data layer with the target address is on the innermost circle of the disk, it is possible to execute the calculation function directly.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method for jumping tracks on a double-layer optical disk from a first address A on a first data layer to a target address D on a second data layer, comprising:
   a. reading the first address A where the optical head is currently positioned;
   b. jumping to the second data layer;
   c. reading a relative second address B on the second data layer that corresponds to the first address A on the first data layer; and
   d. if the second address B on the second data layer is smaller than the first address A on the first data layer, then:
      d1. obtaining a third address C which is equal to the first address A minus the second address B;
      d2. designating the first address A as the address where the optical head is positioned, and obtaining a new target address D+C on the second data layer;
      d3. performing a calculation function based on the first address A and the new target address; and
      d4. moving the optical head to the new target address on the second data layer; and
   e. if the second address B on the second data layer is larger than the first address A on the first data layer, then:
      e1. designating the second address B as the address where the optical head is positioned;
      e2. performing a calculation function based on the second address B and the target address D; and
      e3. moving the optical head to the target address D on the second data layer.

2. The method of claim 1, wherein step d3 includes:
   calculating the number of tracks that the optical head needs to be moved; and
   determining the movement direction of the optical head.

3. A method for jumping tracks on a double-layer optical disk from a first address A on a first data layer to a target address D on a second data layer, comprising:
   a. reading the first address A where the optical head is currently positioned;
   b. jumping to the second data layer;
   c. reading a relative second address B on the second data layer that corresponds to the first address A on the first data layer;
   d. if the second address B on the second data layer is larger than the first address A on the first data layer, then performing a calculation function based on the second address B and the target address D, and moving the optical head to the target address D on the second data layer; and
   e. if the second address B on the second data layer is smaller than the first address A on the first data layer, then:
      e1. shifting the address of the second address B on the second data layer and obtaining a new target address on the second data layer based on this address shift;
      e2. performing a calculation function based on the first address A and the new target address; and
      e3. moving the optical head to the new target address on the second data layer.

4. The method of claim 3, wherein step e3 includes:
   calculating the number of tracks that the optical head needs to be moved; and
   determining the movement direction of the optical head.

* * * * *